June 13, 1961  H. J. RYAN  2,988,250
LINE MARKER

Original Filed Aug. 10, 1953  3 Sheets-Sheet 1

INVENTOR.
HERL J. RYAN

June 13, 1961  H. J. RYAN  2,988,250
LINE MARKER
Original Filed Aug. 10, 1953  3 Sheets-Sheet 2

HERL J. RYAN
INVENTOR.

BY Lynn H Latta
ATTORNEY

June 13, 1961  H. J. RYAN  2,988,250
LINE MARKER

Original Filed Aug. 10, 1953  3 Sheets-Sheet 3

INVENTOR.
HERL J. RYAN

2,988,250
LINE MARKER
Herl J. Ryan, 3421 Mentone Ave., Los Angeles, Calif.
Original application Aug. 10, 1953, Ser. No. 373,135, now Patent No. 2,771,223, dated Nov. 20, 1956. Divided and this application Sept. 5, 1956, Ser. No. 608,159
1 Claim. (Cl. 222—561)

This invention relates to a line marking device of the type shown in my co-pending application Serial No. 373,135, filed August 10, 1953, issued as Patent No. 2,771,223 on November 20, 1956, of which the present application is a division.

One object of the invention is to provide an improved agitating assembly in the mixing chamber of a hopper.

Another object of the invention is to provide an improved gate type valve for closing off the discharge opening in the hopper and for regulating the flow rate of marking powder through the discharge opening.

A further object of the invention is to provide an actuating rod for the gate valve which is mounted on the device in a novel manner so as to be adjustable for varying the position of the valve gate relative to the hopper discharge opening.

A further object of the invention is to provide an improved carriage assembly for supporting the hopper relative to four ground wheels, wherein two of the frame members accommodate a novel gauge device.

Another object of the invention is to provide a one-way driving clutch in one pair of ground wheels having a free wheeling operation when the line marking machine is wheeled in reverse, and becoming automatically engaged for actuation of the agitator when the machine is wheeled in a forward direction.

Other objects and advantages will become apparent upon examination of the following specification and appended three sheets of drawings in which.

Figure 1:
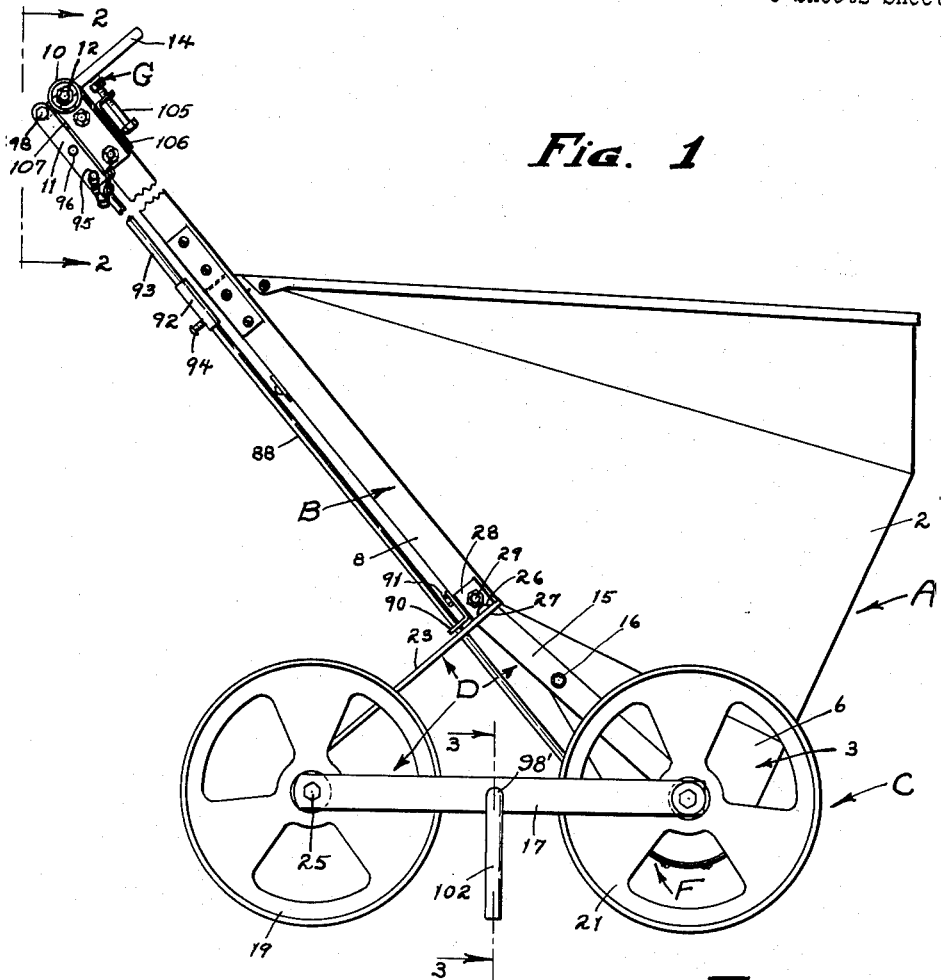
FIG. 1 is a side elevational view of my line marking machine.

The line marking machine includes generally a hopper A, a handle B, a wheel assembly C, a frame D, an agitator assembly E, a gate valve F and a hand-grip assembly G.

The hopper includes an upper section 2 formed of sheet metal such as steel or aluminum and a lower section 3 which may overlap the mouth portion 4 of the upper section and be secured thereto by screws 5. The lower section preferably has opposed side walls 6 of wood and a continuous strip of sheet metal conformed and secured to the margins of the side walls to define a discharge chamber at the bottom of the hopper. The lower section 3 has a semi-cylindric floor surface generated from the axis of the agitator rotor 7.

The handle B comprises a shank 8 fixed to the rear wall of the hopper and projecting upwardly beyond the upper end of the hopper. At the upper end of the shank 8, a pair of hand grips 9 and 10 are abutted against gusset plates 11 which embrace the upper end of shank 8. A bolt 12 extends through both hand grips, through gusset plates 11, through the upper end of handle shank 8, and bridges a slot 13 in the upper end of shank 8. Gusset plates 11 lend rigidity to the overall hand grip assembly. The bolt 12 also serves as a trunnion on which the valve manipulating lever 14 is pivoted. Lever 14 is embraced by the furcations of handle shank 8 on opposite sides of slot 13, the latter being disposed in the vertical median plane of the longitudinal axis of shank B, whereby lever 14 is maintained in a vertical plane, for pivotal movement on the transverse axis of bolt 12.

The hopper is supported above the four ground wheels by the frame members D which include: a pair of metal bracing strips 15 anchored on opposite sides of the lower sections 3 by bolts 16; spacer bars 17 and 18 which serve to maintain the rear wheels 19 and 20 in spaced relation to the front wheels 21 and 22 and diagonal bracing strips 23 and 24 which are fixed to the rear axle 25 and to the respective braces 15 as by rivets or bolts 26. The braces 15 may be bent inwardly at 27 and then upwardly to accommodate the braces 23, 24 and to provide extensions 28 which are anchored to the lower end of the handle shank by bolt 29.

The side walls of the hopper may converge toward each other to form the rather narrow but elongated discharge mouth 4 to which the lower section 3 of the hopper is attached. The side walls 6 are preferably maintained parallel to each other and are provided with bushings 30 and 31 through which the front axle 32 extends, the axle being rotatably carried by said bearings. Spacer sleeves 33 piloted on the axle maintain the front wheels in spaced relation to the side walls 6 so that the wheels clear the converging side walls of the upper section of the hopper—stability against lateral tipping of the machine also being accomplished. Washers 34 take the end thrust on the wheel hubs.

Agitating apparatus, including rotor 7 and other parts indicated by reference numerals 35 through 68, and one-way drive mechanism therefor, indicated by reference numerals 69 through 76, form no part of the present invention, and are accordingly not specifically described herein.

Figure 2:
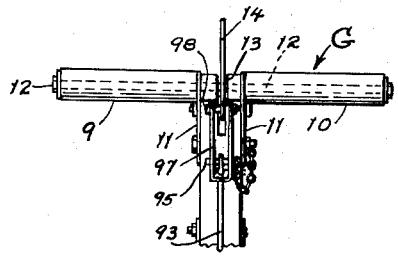
FIG. 2 is a fragmentary detail view taken on line 2—2 of FIG. 1.

The lower section 3 of the hopper is provided with a discharge opening 78 in its floor area and a gate valve 79 is likewise provided with an opening 80. A pair of guide strips 81 and 82 are anchored to opposite sides of the lower section 3 of the hopper and exteriorly thereof, said strips being parallel to each other and conformed to the rounded bottom of the hopper. Additional guide strips 83 likewise conform to the rounded bottom of the hopper and serve to space the strips 81 and 82 from the hopper wall, the strips 81 and 82 having their internal marginal edges 84 and 85 overhanging the internal marginal edges 86 of the underneath strips. The gate valve is of thin sheet material sufficiently flexible to conform to the rounded contour of the hopper floor and said valve is slidably received beneath the overhanging marginal edges of strips 81 and 82 and between the marginal edges of strips 83. The rate of flow of the powder 87 through the discharge openings 78 and 80 is of course regulated by the extent to which such openings are brought into registry by manipulation of the gate valve. The gate valve is actuated by a rod 88 which in turn is actuated rectilinearly of the handle shank 8 by swinging lever 14 about its supporting trunnion 12. The rod 88 is piloted through an opening in a guide bracket 90 which is anchored to the lower end of the handle shank by means of a bolt 91, which bolt also anchors the U-bracket 57 to the handle shank. A coupling sleeve 92 fixed to the end of rod 93 is telescoped over the end of rod 88 and secured thereto by a set screw 94. Viewing FIG. 2 the upper end of rod 93 has at its upper end an opening through which a removable pin 95 projects when such opening is in registry with one of two pairs of openings 96 in the spaced legs of a clevis 97. The clevis 97 is suspended on a pivot pin 98 which is carried by the lower end of valve manipulating lever 14. When adjustment of the gate valve relative to the hopper floor is desired, it is only necessary to withdraw pin 95 and re-insert it after the opening in rod 93 is aligned with a new pair of openings 96 in the clevis 97.

Figure 5:
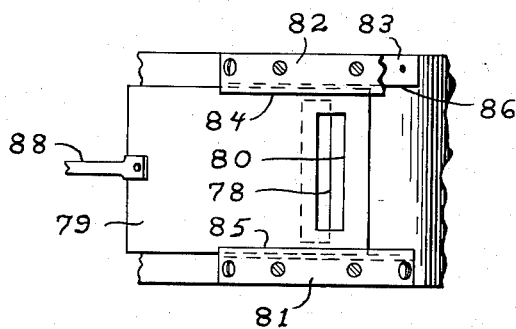
FIG. 5 is a fragmentary detail view of the gate valve.
Figure 6:
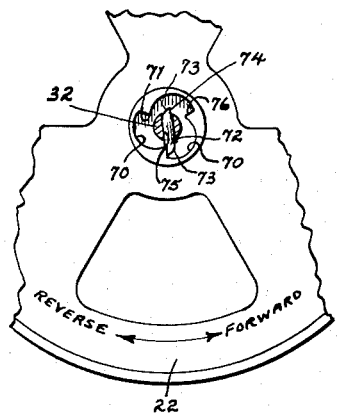
FIG. 6 is a fragmentary detail view of the inner side of the right front (driving) wheel.
Figure 7:
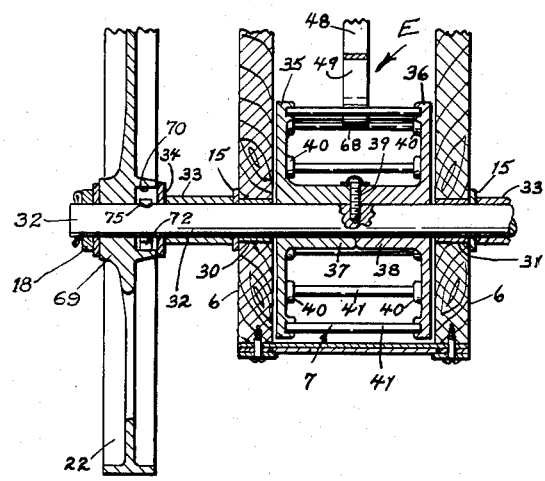
FIG. 7 is a detail sectional view of the central portion of the machine, taken on line 7—7 of FIG. 4.

Defined between the forward metering edge of gate 79 and the forward edge of the narrow metering slot 80 is a closure portion of the gate in the form of a transversely elongated strip of sufficient width to cover the discharge slot 78, the forward edge of this strip functioning as a metering edge when the gate 79 is disposed in a rearward, wide-stream metering position and the said closure strip then functioning to close down the discharge slot 78 by forward movement and to open up the discharge slot 78 by rearward movement. Through the above mentioned adjustment, the gate may be positioned either in this rearward wide-stream metering position or in the forward narrow-stream metering position shown in FIG. 5, wherein the aforesaid closure strip is disposed forwardly of the discharge slot 78 in all positions of metering movement thereof and metering action is effected by the rear edge of slot 80, in variably spaced relation to the forward edge of slot 78, with the body of the gate 79 rearwardly of the slot 80 functioning as a closure in this narrow-stream metering operation and with the side portions of gate 79 at respective ends of slot 80, covering the ends of slot 78 to restrict the width of the stream to the length of the slot 80.

Figure 3:
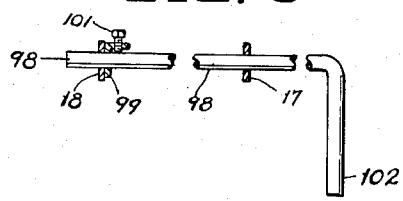
FIG. 3 is a framentary detail view taken on line 3—3 of FIG. 1.

The parallel braces 17 and 18 serve to accommodate a line marked rod 98', one of the braces having an angle bracket 99 (FIGS. 3 and 4) secured to its inner face. The gauge rod is extended through openings in the bracket 99 and braces 17, 18 and a set screw 101 is threaded through bracket 99 to anchor the gauge rod in a preselected position of adjustment relative to the braces 17 and 18, it being understood that the screw 101 can be loosened to change the position of adjustment of the gauge rod as desired. The gauge rod 98' has a downwardly projecting finger 102 which may be caused to follow a guide line so as to guide the machine in a path which will result in a pre-determined line being formed on the ground by the powder discharged from the hopper of the machine as it progresses along such guided path.

In the operation of the machine the gauge rod 98' may or may not be employed, and if employed, then the gauge rod is first adjusted so that the finger 102 is spaced a pre-selected distance outwardly from the side of the machine. Then the initial adjustment of the gate valve is effected by inserting the pin 95 into the desired pair of openings 96. Then lever 14 is manipulated until the desired extent of registry between discharge openings 78 and 80 is obtained. The gate valve will remain in the position selected by manipulation of lever 14 due to the frictional contact of said valve with the hopper floor and the guide strips. When the machine is wheeled in a forward direction the clutch pins 72 each engage one of the clutch teeth 71 and wheels 22 drive axle 32. As the rotor 7 is rotated by axle 32, the transverse pins 41 successively engage the apex 68 of the agitator tongue to raise and lower the tongue. Thus driving the forward movement of the machine, the tongue and associated carrier 44 are being constantly oscillated against the resistance of spring 67. As the apex 68 passes over each pin, it drops rapidly into the pocket formed between adjacent pins, whereby the tongue 45 will effect an agitating action. An agitating action is also imparted by the carrier 44 for causing the powder in the hopper to continue to flow toward the floor of the hopper.

The above mentioned feature of cooperation between the respective end surfaces of the driving pawls 72 and the respective faces of clutch teeth 71, simplifies the manufacture of the clutch units by making it possible to utilize simple cylindrical pins as the basic structure of the pawls, and to mount said pins in simple cylindrical bores without resorting to keys, keyways, etc. for restraining rotation. Restraint of the pawls from rotation is essential in order that the driving faces 74 thereof may be always maintained in forwardly facing positions, for correct engagement with the driving faces 76 of the clutch teeth.

For limiting the extent movement of lever 14 (whereby to limit the degree of possible adjustment of valve plate 79 toward the open position from a position of maximum closure thereof) there is provided an adjustable stop consisting in a screw 105 which is threaded through an L-shaped bracket 106 secured to the upper end of handle shaft B. Screw 105 has a head at both ends, one to function as a knob for manipulating the screw, and the other, in normally spaced relation to lever 14, providing a broad surface against which the lever 14 may make abutting contact to limit its movement.

Covering and uncovering the valve opening 78 in the bottom of hopper 3 is controlled by the rearward edge of slot 80 in gate valve 79 when the push rod 93 is in extended relation to clevis 11 (with pin 95 coupled in the lower pair of openings 96 of the clevis as shown in FIG. 1) whereas, when the clevis and push rod 93 are in close coupled relation (with pin 95 in the upper pair of openings 96) the slot 80 will be inoperative and the forward edge of gate valve 79 will execute a cut-off action with reference to hopper aperture 78. In the latter case, the line which is deposited upon the ground by the apparatus will be a maximum width line determined by the longitudinal dimension of hopper aperture 78, whereas in the former case, the line will be a minimum width line determined by the shorter longitudinal dimension of gate aperture 80. Thus the two positions of coupling between the upper end of rod 93 and clevis 11 determine the change-over from a narrow line to a wide line and vice versa.

Figure 4:
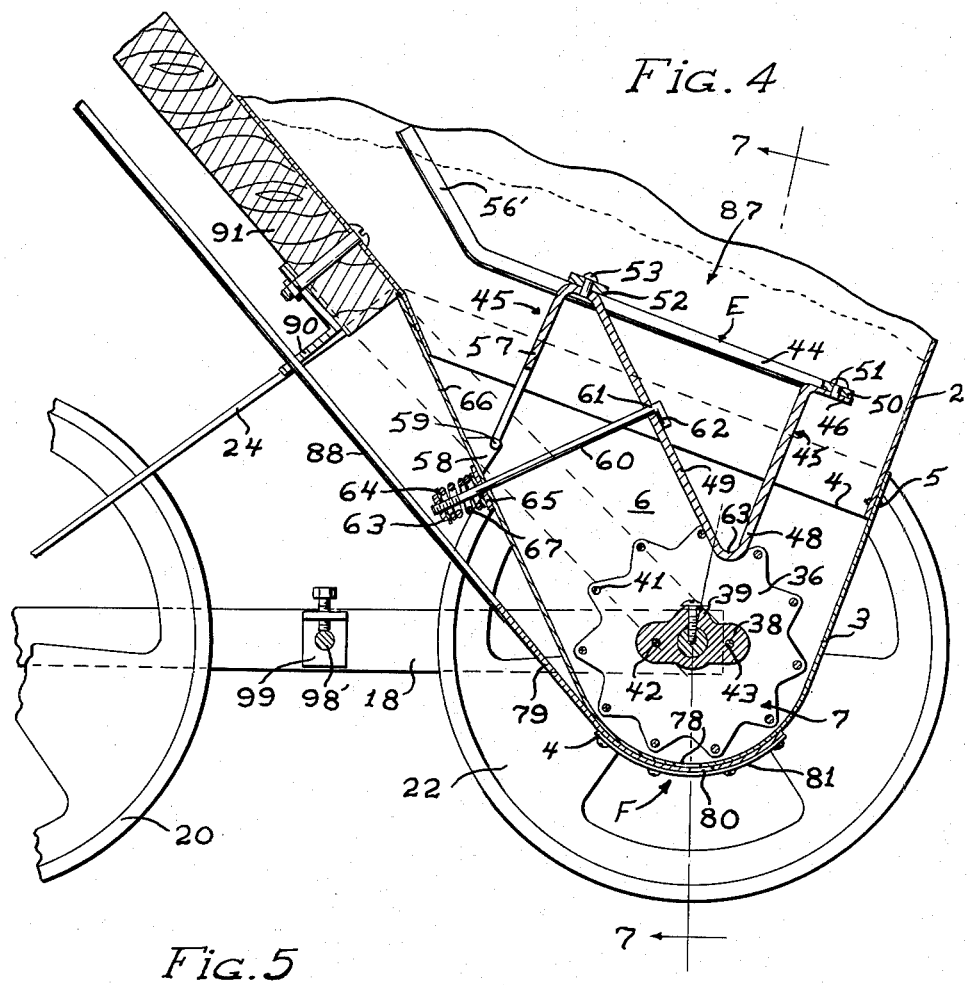
FIG. 4 is a sectional view through the lower portion of the machine.

It may further be pointed out that the function of adjustment screw 105, as it is adjusted from one setting to another, is to vary the extent of opening of the discharge aperture, whereby to vary the rate of flow from the hopper, thereby varying the depth of the layer of material which is deposited upon the ground to form the line. In this connection, it may be noted that the normal operation of the gate valve 79 will be from a fully open to a fully closed position, so as to entirely cut off the flow of material whenever desired. The fully open position is a variable position, determined by the abutment of lever 14 against stop screw 105. The fully closed position is a fixed position, determined by the engagement of the forward edge of the downwardly projecting portion of lever 14 (immediately above pin 98) against the upper, rearward edge of a stop plate 107 (FIG. 1) which is fastened to the under side of handle shank B, bridging across the rear portion of slot 13. In FIG. 1 the lever 14 is in engagement with the stop plate 107 and thus in the fixed limit position which determines the full closing of gate valve 79. In FIG. 4, the gate valve is shown in the variable open position which is determined by the engagement of lever 14 against stop screw 105, in the position of adjustment of the latter shown in FIG. 1. It will be apparent that by adjusting stop screw 105 downwardly and forwardly from the position of FIG. 1, a greater degree of opening of the discharge aperture will be provided.

I claim:

Apparatus for selectively variable-width line-marking by deposition of marking powder upon a surface to be marked, comprising: in combination: a hopper provided in its bottom with a transversely extending discharge slot having a length determining the width of a relatively wide line; guide means extending fore-aft past the respective ends of said slot; a valve gate having respective side portions slidably mounted in said guide means for fore-aft metering movement thereof, said gate having a single transverse metering slot, shorter than said discharge slot, for determining the width of a relatively narrow line and having, forwardly of said metering slot, a transversely elongated closure strip having a fore-aft width sufficient to cover said discharge slot when said gate is adjusted to a rearward wide-stream metering position, said closure strip having a forward margin operative as a metering edge in opposed, variably spaced relation to the forward edge of said discharge slot for metering a wide stream of said powder through the full length of said discharge slot, with said closure strip moving forwardly to close down said discharge slot and rearwardly to open up said discharge slot; actuating means for moving said gate in fore-aft metering movement; said means for transmitting movements from said actuating means to said gate, including adjustable means for positioning said gate selectively in said rearward position, for said wide-stream metering operation, or in a forward, narrow-stream metering position wherein said closure strip is disposed largely forwardly of said discharge slot in all positions of said narrow-stream metering, the rear edge of said metering slot then being in opposed variably spaced relation to the forward edge of said discharge slot to define a metering aperture for narrow-stream flow, the body of said gate rearwardly of said metering slot then functioning for closing down said metering aperture upon moving forwardly and for opening up said aperture upon moving rearwardly, and said gate having side portions at respective ends of said metering slot, covering the ends of said discharge aperture so as to restrict the width of the stream to the length of said metering slot, thereby to provide the narrow-stream flow.

References Cited in the file of this patent

UNITED STATES PATENTS

| | | |
|---|---|---|
| 85,379 | Going | Dec. 29, 1868 |
| 1,219,737 | Heilig | Mar. 20, 1917 |
| 1,295,609 | Schulze | Feb. 25, 1919 |
| 1,767,781 | Aulbach et al. | June 24, 1930 |
| 1,882,340 | Ryan | Oct. 11, 1932 |
| 2,069,350 | Blue | Feb. 2, 1937 |
| 2,123,318 | Taylor | July 12, 1938 |
| 2,162,999 | Frank | June 20, 1939 |
| 2,767,887 | Bond et al. | Oct. 23, 1956 |
| 2,771,223 | Ryan | Nov. 20, 1956 |